(12) United States Patent
Choi

(10) Patent No.: US 10,352,593 B2
(45) Date of Patent: Jul. 16, 2019

(54) GAS HEAT-PUMP SYSTEM

(71) Applicant: LG ELECTRONICS INC., Seoul (KR)

(72) Inventor: Minhwan Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 111 days.

(21) Appl. No.: 15/234,015

(22) Filed: Aug. 11, 2016

(65) Prior Publication Data

US 2017/0089617 A1    Mar. 30, 2017

(30) Foreign Application Priority Data

Sep. 30, 2015   (KR) ......................... 10-2015-0137601

(51) Int. Cl.
*F25B 13/00*     (2006.01)
*F25B 43/00*     (2006.01)
(Continued)

(52) U.S. Cl.
CPC .............. *F25B 13/00* (2013.01); *F24H 4/00* (2013.01); *F25B 27/02* (2013.01); *F25B 41/04* (2013.01);
(Continued)

(58) Field of Classification Search
CPC ......... F25B 27/02; F25B 40/06; F25B 43/006
See application file for complete search history.

(56) References Cited

U.S. PATENT DOCUMENTS

| | | | |
|---|---|---|---|
| 7,503,184 B2 * | 3/2009 | Copeland ................ | F25B 13/00 62/238.7 |
| 9,879,881 B2 * | 1/2018 | Hawkins ................... | F24H 4/02 |
| 2006/0179874 A1 * | 8/2006 | Barger ..................... | F25B 6/04 62/506 |

FOREIGN PATENT DOCUMENTS

| | | |
|---|---|---|
| DE | 10-2010-010357 | 9/2011 |
| DE | 10-2012-106894 | 2/2013 |

(Continued)

OTHER PUBLICATIONS

Korean Office Action dated Jul. 1, 2016 issued in Application No. 10-2015-0137601.
(Continued)

*Primary Examiner* — Christopher R Zerphey
(74) *Attorney, Agent, or Firm* — KED & Associates LLP

(57) ABSTRACT

A gas heat-pump system is provided. The gas heat-pump system may include an air-conditioning system including at least one compressor, an outdoor heat exchanger, an expander, an indoor heat exchanger, and a refrigerant pipe; an engine configured to provide power for an operation of the at least one compressor, and in which a mixed fuel, in which a fuel and air are mixed, is burned; a cooling water pump which pumps a flow of cooling water that cools the engine; a cooling water pipe connected to the cooling water pump, and configured to guide the flow of the cooling water; an auxiliary heat exchanger in which heat exchange between the cooling water flowing through the cooling water pipe and a refrigerant flowing through the refrigerant pipe is performed; a hot water heat exchanger, in which heat exchange between the cooling water flowing through the cooling water pipe and a fluid supplied from a hot water supply tank is performed; and a plurality of flow switches installed at the cooling water pipe, and controlled so that the cooling water discharged from the engine is guided to the auxiliary heat exchanger or the hot water heat exchanger.

19 Claims, 7 Drawing Sheets

(51) Int. Cl.
  *F25B 40/04*   (2006.01)
  *F24H 4/00*   (2006.01)
  *F25B 27/02*   (2006.01)
  *F25B 41/04*   (2006.01)

(52) U.S. Cl.
  CPC ........ *F25B 43/006* (2013.01); *F24D 2200/12* (2013.01); *F24D 2200/26* (2013.01); *F25B 2313/02741* (2013.01); *F25B 2400/13* (2013.01); *F25B 2500/13* (2013.01); *Y02B 10/70* (2013.01); *Y02B 30/12* (2013.01); *Y02B 30/13* (2018.05); *Y02B 30/52* (2013.01)

(56) References Cited

FOREIGN PATENT DOCUMENTS

| | | | | |
|---|---|---|---|---|
| EP | 1334851 | | 8/2003 | |
| EP | 1724134 | * | 11/2006 | .............. B60H 1/32 |
| JP | H 09-014801 | | 1/1997 | |
| JP | 2003-232582 | | 8/2003 | |
| JP | 2012-093081 | | 5/2012 | |
| JP | 2012093081 A | * | 5/2012 | .............. F25B 27/00 |
| JP | 2014-219169 | | 11/2014 | |
| KR | 10-2015-0048403 | | 5/2015 | |

OTHER PUBLICATIONS

European Search Report dated Feb. 3, 2017 issued in Application No. 16184344.6.

* cited by examiner

GAS HEAT-PUMP SYSTEM

CROSS-REFERENCE TO RELATED APPLICATION(S)

This application claims priority under 35 U.S.C. § 119 and 35 U.S.C. § 365 to Korean Patent Application No. 10-2015-0137601, filed in Korea on Sep. 30, 2015, whose entire disclosure is hereby incorporated by reference.

BACKGROUND

1. Field

A gas heat-pump system is disclosed herein.

2. Background

A heat-pump system is a system having a refrigeration cycle which may perform a cooling operation or a warming operation. The heat-pump system may be coupled with a hot-water supply apparatus or an air conditioner, for example. That is, hot water may be produced or air-conditioning for the cooling and warming operations may be performed using a heat source obtained by heat exchange between a refrigerant of the refrigeration cycle and a predetermined heat storage medium. For the refrigeration cycle, a compressor that compresses the refrigerant, a condenser that condenses the refrigerant compressed in the compressor, an expander that depressurizes the refrigerant condensed in the condenser, and an evaporator that evaporates the depressurized refrigerant are included.

The heat-pump system includes a gas heat-pump (GHP) system. In the GHP system, a high-capacity compressor, which is not intended for home use, but for industries or for air-conditioning a large building, is required. That is, the GHP system may be used as a system that uses a gas engine, instead of an electric motor, to drive a compressor to compress a large amount of refrigerant into a high temperature and high pressure gas. The GHP system may include an engine that generates power using a mixture (hereinafter, a mixed fuel) of fuel and air, an air supply device that supplies the mixed fuel to the engine, a fuel supply device, and a mixer that mixes the air with the fuel.

The engine may include a cylinder, to which the mixed fuel is supplied, and a piston, which is provided in the cylinder to be movable. The air supply device may include an air filter that purifies the air. The fuel supply device may include a zero governor to supply the fuel having a constant pressure.

The GHP system may include cooling water, which cools the engine while being circulated in the engine. The cooling water may absorb waste heat of the engine, and the absorbed waste heat may be supplied to the refrigerant circulated in the GHP system, and may assist performance enhancement of the system. In particular, when the warming operation is performed by the GHP system, evaporation performance in the refrigeration cycle may be enhanced.

However, the waste heat of the engine may be continuously produced more than necessary for assisting the refrigeration cycle. But as a conventional GHP system is not configured to additionally use the remaining waste heat of the engine, there is a problem in that the remaining waste heat is abandoned to the outside.

A conventional GHP system is disclosed in Korean Patent No. 10-1341533, issued on Dec. 9, 2013, entitled "Gas Heat-pump System and Control Method thereof", which is hereby incorporated by reference.

BRIEF DESCRIPTION OF THE DRAWINGS

Embodiments will be described in detail with reference to the following drawings in which like reference numerals refer to like elements, and wherein.

DETAILED DESCRIPTION

Hereinafter, embodiments will be described in detail with reference to the accompanying drawings. However, the embodiments are not limited to the embodiments disclosed below, and those skilled in the art appreciating the ideas presented can easily propose other embodiments within the scope.

Figure 1:
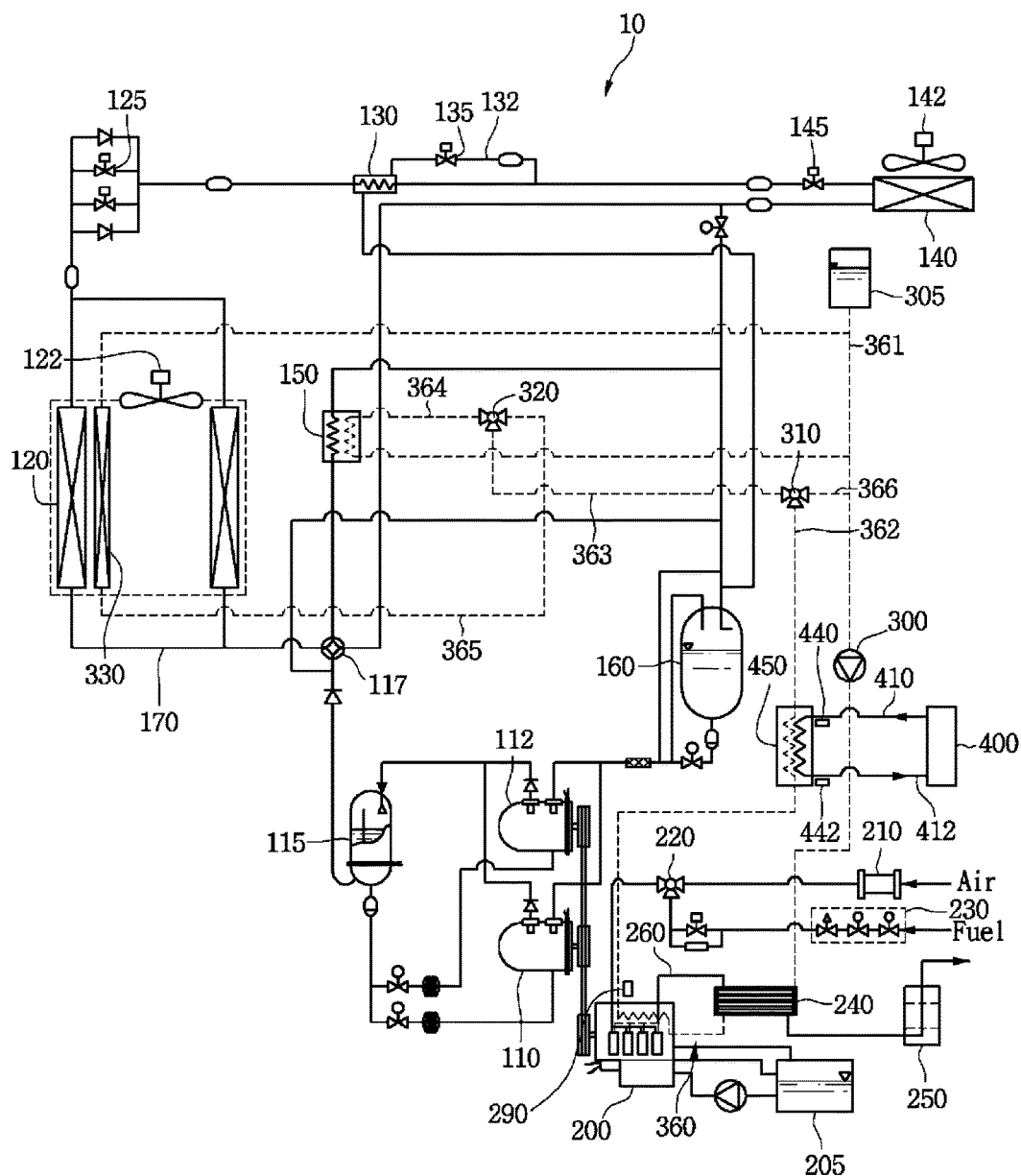
FIG. 1 is a schematic diagram of a gas heat-pump (GHP) system according to an embodiment.

FIG. 1 is a schematic diagram of a gas heat-pump (GHP) system according to an embodiment. Referring to FIG. 1, a GHP system 10 according to this embodiment may include a plurality of components, which may form a refrigeration cycle of an air-conditioning system. More specifically, for the refrigeration cycle, first and second compressors 110 and 112 that compress a refrigerant, an oil separator 115 that separates oil from the refrigerant compressed in the first and second compressors 110 and 112, and a 4-way valve 117 that switches a direction of the refrigerant passed through the oil separator 115 may be included.

The GHP system 10 may further include an outdoor heat exchanger 120 and an indoor heat exchanger 140. The outdoor heat exchanger 120 may be provided in an outdoor unit or device located at an outdoor side, and the indoor heat exchanger 140 may be provided in an indoor unit or device located at an indoor side. The refrigerant passed through the 4-way valve 117 may flow to the outdoor heat exchanger 120 or the indoor heat exchanger 140.

Components of the system illustrated in FIG. 1 may be provided at the outdoor side, that is, inside the outdoor unit or device, except the indoor heat exchanger 140, and indoor fan 142, and an indoor expander 145. When the GHP system 10 is operated in a cooling operation mode, the refrigerant passed through the 4-way valve 117 may flow toward the indoor heat exchanger 140 via the outdoor heat exchanger 120. However, when the GHP system 10 is operated in a warming operation mode, the refrigerant passed through the 4-way valve 117 may flow toward the outdoor heat exchanger 120 via the indoor heat exchanger 140.

The GHP system 10 may further include a refrigerant pipe 170 (solid line path) that connects the compressors 110 and 112, the outdoor heat exchanger 120, and the indoor heat exchanger 140, for example, and guides a flow of the refrigerant.

A configuration of the GHP system 10 will be described based on the cooling operation mode.

The refrigerant having flowed to or into the outdoor heat exchanger 120 may be condensed by exchanging heat with external air. An outdoor fan 122 that blows external air may be provided at one side of the outdoor heat exchanger 120.

A main expander 125 that depressurizes the refrigerant may be provided at an outlet side of the outdoor heat exchanger 120. For example, the main expander 125 may include an electronic expansion valve (EEV). When a cooling operation is performed, the main expander 125 may be fully opened, and thus, the refrigerant may not be depressurized.

A subcooling heat exchanger 130, which may additionally cool the refrigerant, may be provided at an outlet side of the main expander 125. A subcooling path 132 may be connected to the subcooling heat exchanger 130. The subcooling path 132 may be branched from the refrigerant pipe 170, and connected to the subcooling heat exchanger 130.

A subcooling expander 135 may be provided at the subcooling path 132. The refrigerant flowing through the subcooling path 132 may be depressurized while passing through the subcooling expander 135. Heat exchange between the refrigerant in the refrigerant pipe 170 and the refrigerant in the subcooling path 132 may be performed at the subcooling heat exchanger 130. In the heat exchange, the refrigerant in the refrigerant pipe 170 may be subcooled, and the refrigerant in the subcooling path 132 may absorb heat.

The subcooling path 132 may be connected to a gas-liquid separator 160. The refrigerant in the subcooling path 132, which may be heat-exchanged in the subcooling heat exchanger 130, may be introduced into the gas-liquid separator 160.

The refrigerant in the refrigerant pipe 170 having passed through the subcooling heat exchanger 130 may flow toward the indoor unit or device, and may be depressurized in the indoor expander 145 and then evaporated in the indoor heat exchanger 140. The indoor expander 145 may be provided inside of the indoor unit or device, and may be configured with the EEV.

The refrigerant evaporated in the indoor heat exchanger 140 may flow to an auxiliary heat exchanger 150 via the 4-way valve 117. The auxiliary heat exchanger 150 may be a heat exchanger in which heat exchange between the evaporated low-pressure refrigerant and high-temperature cooling water may be performed, and may include, for example, a plate type heat exchanger.

As the refrigerant evaporated in the indoor heat exchanger 140 may absorb the heat while passing through the auxiliary heat exchanger 150, evaporation efficiency may be improved. The gas-liquid separator 160 that separates the gas refrigerant from the evaporated refrigerant may be provided at an outlet side of the auxiliary heat exchanger 150. The gas refrigerant and the liquid refrigerant having passed through the auxiliary heat exchanger 150 may be separated from each other in the gas-liquid separator 160, and the separated gas refrigerant may be suctioned into the first and second compressors 110 and 112.

The GHP system 10 may further include a cooling water tank 305, in which the cooling water for cooling an engine 200 may be stored, and a cooling water pipe 360 (dotted line path) that guides a flow of the cooling water. A cooling water pump 300 that generates a flowing force of the cooling water, a plurality of flow switches 310 and 320 that switches a flow direction of the cooling water, and a radiator 330 that cools the cooling water may be provided at or along the cooling water pipe 360.

The plurality of flow switches 310 and 320 may include a first flow switch 310 and a second flow switch 320. For example, each of the first flow switch 310 and the second flow switch 320 may include a 3-way valve. The first flow switch 310 may be referred to as a "first 3-way valve", and the second flow switch 320 may be referred to as a "second 3-way valve".

The radiator 330 may be provided at one side of the outdoor heat exchanger 120, and the cooling water in the radiator 330 may exchange heat with the external air by driving of the outdoor fan 122, and thus, may be cooled in this process. When the cooling water pump 300 is driven, the cooling water stored in the cooling water tank 305 may pass through the engine 200, which will be described hereinbelow, and an exhaust gas heat exchanger 240, and then may selectively flow to the radiator 330 or the auxiliary heat exchanger 150 via the first flow switch 310 and the second flow switch 320.

The GHP system 10 may include the engine 200, which may generate power to drive the first and second compressors 110 and 112, and a mixer 220, which may be provided at an inlet side of the engine 200 to supply a mixed fuel. The GHP system 10 may include an air filter 210 that supplies purified air to the mixer 220, and a zero governor 230 that supplies a fuel having a predetermined pressure or less. The zero governor 230 may be a device that constantly controls and supplies an outlet pressure of the fuel, regardless of an inlet pressure of the fuel or a change in a flow rate.

The air having passed through the air filter 210 and the fuel discharged from the zero governor 230 may be mixed in the mixer 220, and form a mixed fuel. The mixed fuel may be supplied to the engine 200.

The GHP system 10 may further include the exhaust gas heat exchanger 240, which may be provided at an outlet side of the engine 200 and into which an exhaust gas generated after burning the mixed fuel may be introduced via a pipe 260, and a muffler 250, which may be provided at an outlet side of the exhaust gas heat exchanger 240 to reduce a noise of the exhaust gas. The heat exchange between the cooling water and the exhaust gas may be performed in the exhaust gas heat exchanger 240. An oil tank 205, which may supply oil to the engine 200, may be provided at one side of the engine 200.

The cooling water pipe 360 may include a first pipe 361, which may extend from the cooling water tank 305 toward the engine 200. The first pipe 361 may include a first pipe portion that extends from the cooling water tank 305 to the exhaust gas heat exchanger 240, and a second pipe portion that extends from the exhaust gas heat exchanger 240 to the engine 200. Therefore, the cooling water supplied from the cooling water tank 305 may exchange heat with the exhaust gas while passing through the exhaust gas heat exchanger 240, and may be introduced into the engine 200, and thus, collect waste heat of the engine 200. The cooling water pump 300, which may provide a flow of the cooling water, may be provided at the first pipe 361.

The cooling water pipe 360 may further include a second pipe 362, which may guide the cooling water passed through the engine 200 to the first flow switch 310. The second pipe 362 may be a pipe that extends from the outlet side of the engine 200 to a first port 311 (refer to FIG. 3) of the first flow switch 310.

A hot water heat exchanger 450 may be provided at the second pipe 362. The hot water heat exchanger 450 may be a heat exchanger that heat-exchanges a fluid supplied from a hot water supply tank 400 with the cooling water flowing through the second pipe 362. For example, the fluid may include water. As heat exchange between the fluid and the cooling water may be performed in the hot water heat exchanger 450, the fluid may be heated, and the cooling water may be cooled.

The cooling water pipe 360 may further include a third pipe 363 that guides the cooling water from the first flow switch 310 to the second flow switch 320. The third pipe 363 may be a pipe that extends from a second port 312 (refer to FIG. 3) of the first flow switch 310 to a first port 321 of the second flow switch 320.

The cooling water pipe 360 may further include a fourth pipe 364 that guides the cooling water from the second flow switch 320 to the auxiliary heat exchanger 150. The fourth pipe 364 may extend from a second port 322 (refer to FIG. 3) of the second flow switch 320 to the auxiliary heat exchanger 150, pass through the auxiliary heat exchanger 150, and then extend and be coupled to a first point of the first pipe 361.

The cooling water pipe 360 may further include a fifth pipe 365 that guides the cooling water from the second flow switch 320 to the radiator 330. The fifth pipe 365 may extend from a third port 323 (refer to FIG. 3) of the second flow switch 320 to the radiator 330, pass through the radiator 330, and then extend and be coupled to a second point of the first pipe 361.

The cooling water pipe 360 may further include a sixth pipe 366 that guides the cooling water from the first flow switch 310 to the first pipe 361. The sixth pipe 366 may be a pipe that extends from a third port 313 (refer to FIG. 3) of the first flow switch 310, and be coupled to a third point of the first pipe 361.

For example, when a temperature of the cooling water having passed through the engine 200 is less than a set or predetermined temperature, this means that an effect in which the cooling water flows to the auxiliary heat exchanger 150 or the radiator 330 and exchanges heat with it is poor, and thus, the cooling water introduced into the first port 311 of the first flow switch 310 may be bypassed to the first pipe 361 through the sixth pipe 366, and then may be guided to the engine 200. The sixth pipe 366 may be referred to as a "bypass pipe".

The GHP system 10 may include hot water supply paths 410 and 412 that connect the hot water supply tank 400 with the hot water heat exchanger 450. The hot water supply paths 410 and 412 may include an inlet path 410 that guides the fluid from the hot water supply tank 400 to the hot water heat exchanger 450, and an outlet path 412 that returns the fluid heat-exchanged in the hot water heat exchanger 450 to the hot water supply tank 400.

The GHP system 10 may include temperature sensors 440 and 442, which may be provided at the hot water supply paths 410 and 412, respectively. The temperature sensors 440 and 442 may include a first temperature sensor 440, which may be provided at the inlet path 410 to detect a temperature of the fluid introduced into the hot water heat exchanger 450, and a second temperature sensor 442, which may be provided at the outlet path 412 to detect a temperature of the fluid discharged from the hot water heat exchanger 450.

The GHP system 10 may include a cooling water temperature sensor 290, which may be provided at the outlet side of the engine 200 to detect a temperature of the cooling water having passed through the engine 200. When a temperature of the cooling water detected by the cooling water temperature sensor 290 is a set or predetermined temperature or more, the GHP system 10 may be operated in a first mode, and when the temperature of the cooling water is less than the set or predetermined temperature, the GHP system 10 may be operated in a second mode. This will be described hereinbelow.

Hereinafter, actions of the cooling water and the mixed fuel according to an operation mode of the GHP system 10 according to an embodiment will be described.

Figure 2:
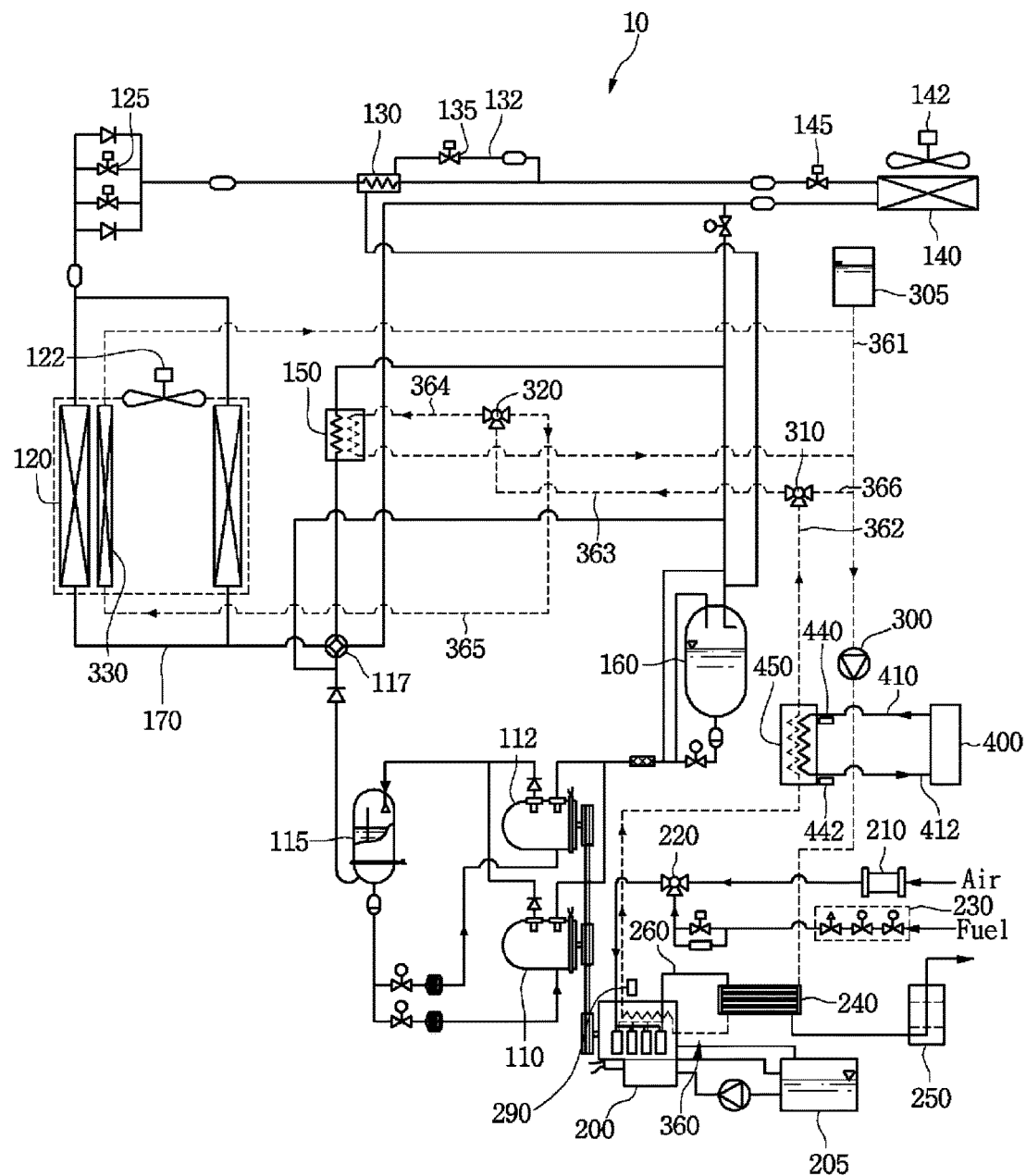
FIG. 2 is a schematic diagram illustrating flows of a refrigerant, cooling water, and a mixed fuel when the GHP system of FIG. 1 is operated.

FIG. 2 is a schematic diagram illustrating flows of a refrigerant, cooling water, and a mixed fuel when the GHP system of FIG. 1 is operated.

First, when the GHP system 10 performs a warming operation, the refrigerant passes through the first and second compressors 110 and 112, the oil separator 115, the 4-way valve 117, the indoor heat exchanger 140 and the subcooling heat exchanger 130, is depressurized in the main expander 125, and exchanges heat in the outdoor heat exchanger 120, and then is introduced again into the 4-way valve 117. The indoor heat exchanger 140 may serve as a "condenser", and the outdoor heat exchanger 120 may serve as an "evaporator".

The refrigerant having passed through the 4-way valve 117 may be introduced into the auxiliary heat exchanger 150, and may exchange heat with the cooling water flowing through the fourth pipe 364. The refrigerant introduced into the auxiliary heat exchanger 150 is an evaporated refrigerant, and has a lower temperature and lower pressure, and the cooling water supplied to the auxiliary heat exchanger 150 has a high temperature due to heat of the engine 200. Therefore, the refrigerant in the auxiliary heat exchanger 150 may absorb heat from the cooling water, and thus, evaporation performance may be improved.

The refrigerant heat-exchanged in the auxiliary heat exchanger 150 may be introduced into the gas-liquid separator 160 and phase-separated, and then may be suctioned into the first and second compressors 110 and 112. The refrigerant may flow while repeating the above-described cycle.

When the cooling water pump 300 is driven, the cooling water discharged from the cooling water pump 300 may be introduced into the exhaust gas heat exchanger 240 along the first pipe 361, and exchange heat with the exhaust gas. The cooling water discharged from the exhaust gas heat exchanger 240 may be introduced into the engine 200, cool the engine 200, pass through the second pipe 362, and be introduced into the first port 311 of the first flow switch 310.

By control of the first flow switch 310, the cooling water having passed through the first flow switch 310 may flow toward the second flow switch 320 along the third pipe 363. The cooling water having passed through the second flow switch 320 may be introduced into the auxiliary heat exchanger 150 via the fourth pipe 364, and may exchange heat with the refrigerant. The cooling water having passed through the auxiliary heat exchanger 150 may be introduced into the cooling water pump 300. The cooling water may flow while repeating such a cycle.

In the warming operation, a flow of the cooling water toward the radiator 330 may be limited. Generally, as the warming operation is performed when the external air has a low temperature, there is a high possibility that the cooling water is cooled while flowing through the cooling water pipe 360, even though not being cooled in the radiator 330. Therefore, when the warming operation is performed, the first and second flow switches 310 and 320 may be controlled so that the cooling water does not pass through the radiator 330. However, when the heat exchange in the auxiliary heat exchanger 150 is not required, the cooling water may be introduced from the second flow switch 320 into the radiator 330 via the fifth pipe 365.

The driving of the engine 200 will be described hereinafter. The air filtered in the air filter 210 and the fuel, a pressure of which may be controlled through the zero governor 230, may be mixed in the mixer 220. The mixed fuel mixed in the mixer 220 may be supplied to the engine 200, and drive the engine 200. The exhaust gas discharged from the engine 200 may be introduced into the exhaust gas heat exchanger 240, exchange heat with the cooling water, and then be discharged to the outside via the muffler 250.

When the GHP system 10 performs a cooling operation, the refrigerant may pass through the first and second compressors 110 and 112, the oil separator 115, the 4-way valve 117, the outdoor heat exchanger 120, and the subcooling heat exchanger 130, and be depressurized in the indoor expander 145, and exchanges heat in the indoor heat exchanger 140, and then may be introduced again into the 4-way valve 117. The outdoor heat exchanger 120 may serve as a "condenser", and the indoor heat exchanger 140 may serve as an "evaporator".

The refrigerant having passed through the 4-way valve 117 may be introduced into the auxiliary heat exchanger 150, and may exchange heat with the cooling water flowing through the cooling water pipe 360. The refrigerant heat-exchanged in the auxiliary heat exchanger 150 may be introduced into the gas-liquid separator 160 and be phase-separated, and then may be suctioned into the first and second compressors 110 and 112. The refrigerant may flow while repeating the above-described cycle.

When the cooling water pump 300 is driven, the cooling water discharged from the cooling water pump 300 may be introduced into the exhaust gas heat exchanger 240, and exchange heat with the exhaust gas. The cooling water discharged from the exhaust gas heat exchanger 240 may be introduced into the engine 200, cool the engine 200, and be introduced into the first flow switch 310. The flow of the cooling water until being introduced into the first flow switch 310 may be the same as that of the cooling water in the warming operation.

The cooling water having passed through the first flow switch 310 may be introduced into the second flow switch 320 and may flow to the radiator 330 by control of the second flow switch 320, and may exchange heat with the external air. The cooling water cooled in the radiator 330 may be introduced into the cooling water pump 300. The cooling water may flow while repeating such a cycle.

In the cooling operation, the flow of the cooling water toward the auxiliary heat exchanger 150 may be limited. Generally, as the cooling operation is performed when the external air has a high temperature, heat absorption of the evaporated refrigerant for ensuring evaporation performance may not be required. Therefore, when the cooling operation is performed, the first and second flow switches 310 and 320 may be controlled so that the cooling water does not pass through the auxiliary heat exchanger 150. However, when heat exchange in the auxiliary heat exchanger 150 is required, the cooling water may be introduced into the auxiliary heat exchanger 150 via the second flow switch 320.

As the driving of the engine 200 is the same as that of the engine 200 in the warming operation, detailed description thereof has been omitted.

Figure 3:
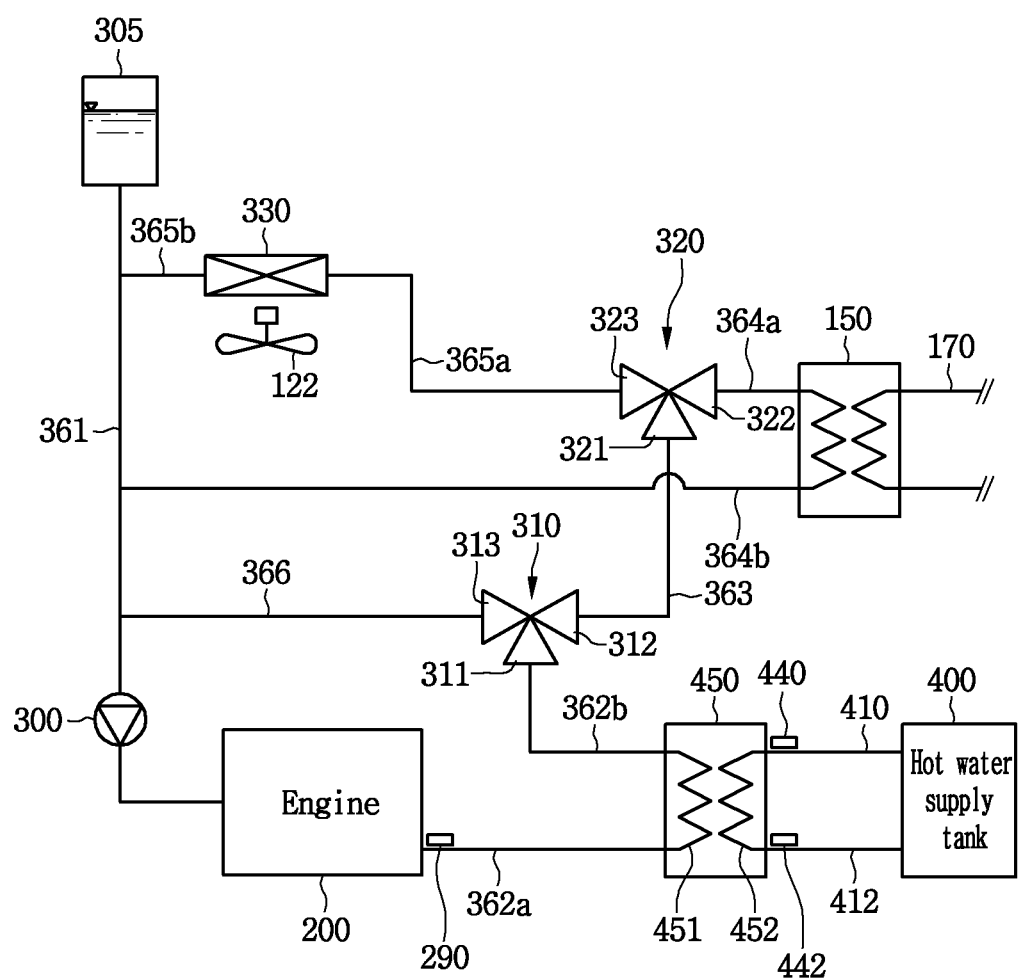
FIG. 3 is a schematic diagram of a main portion of the GHP system of FIG. 1.
Figure 4:
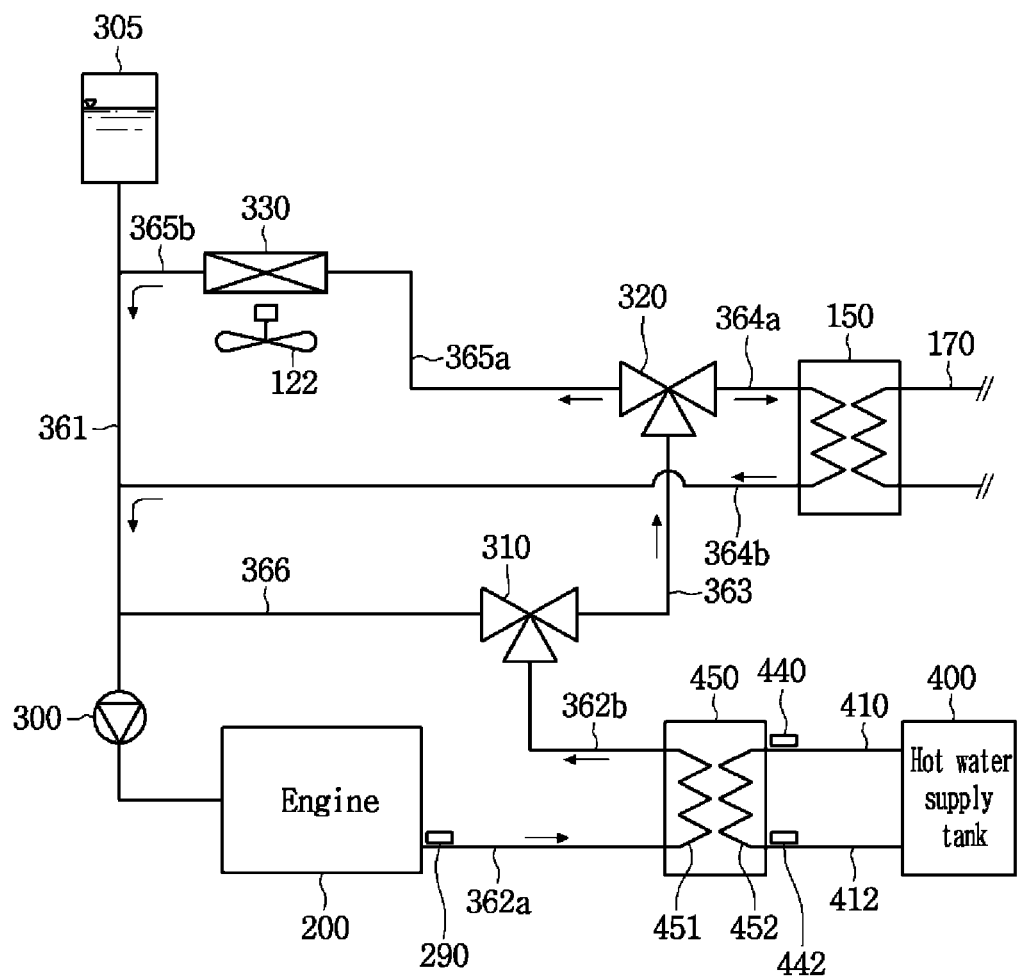
FIG. 4 is a schematic diagram illustrating a flow of the cooling water in the main portion of the GHP system of FIG. 3 when the GHP system is operated in a first mode.
Figure 5:
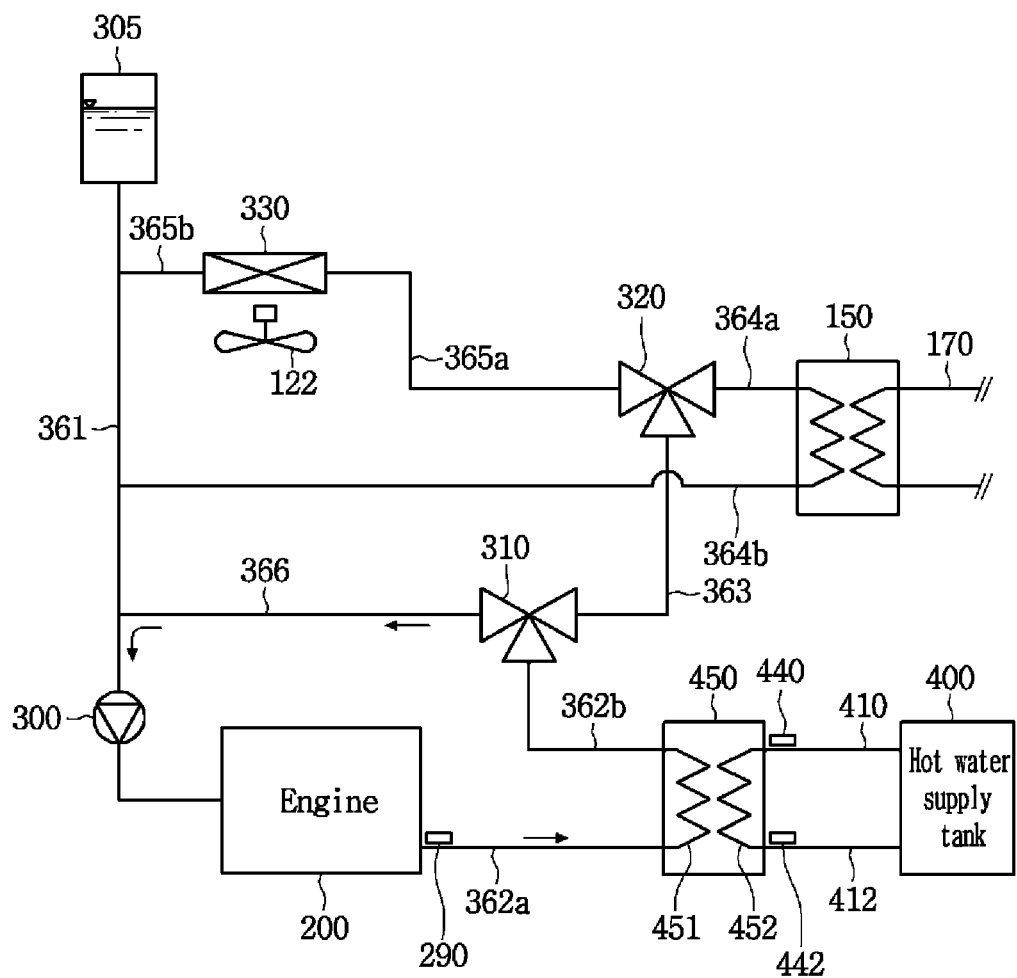
FIG. 5 is a schematic diagram illustrating a flow of the cooling water in the main portion of the GHP system of FIG. 3 when the GHP system is operated in a second mode.

FIG. 3 is a schematic diagram of a main portion of the GHP system of FIG. 1. FIG. 4 is a schematic diagram illustrating a flow of the cooling water in the main portion of GHP system of FIG. 3 when the GHP system is operated in a first mode. FIG. 5 is a schematic diagram illustrating a flow of the cooling water in the main portion of GHP system of FIG. 3 when the GHP system is operated in a second mode.

Referring to FIG. 3, the GHP system 10 according to this embodiment may include the hot water heat exchanger 450, in which the heat exchange between the cooling water heated while passing through the engine 200 and the fluid in the hot water supply tank 400 may be performed. The hot water heat exchanger 450 may be provided at the second pipe 362 that extends from the engine 200 to the first port 311 of the first flow switch 310. The second pipe 362 may include a first introduction pipe 362a that extends from the outlet side of the engine 200 to the hot water heat exchanger 450, and a first discharge pipe 362b that extends from the hot water heat exchanger 450 to the first flow switch 310.

A cooling water pipe 451 for hot water supply that guides the flow of the cooling water may be provided inside of the hot water heat exchanger 450. The cooling water pipe 451 may be a pipe that forms at least a portion of the second pipe 362. A hot water pipe 452 for hot water supply that guides the flow of the fluid may be provided inside of the hot water heat exchanger 450. The hot water pipe 452 may be a pipe that forms at least a portion of the hot water supply paths 410 and 412.

The GHP system 10 may include the fourth pipe 364 that guides the flow of the refrigerant passing through the auxiliary heat exchanger 150. The fourth pipe 364 may include a second introduction pipe 364a that guides the flow of the refrigerant from the second port 322 of the second flow switch 320 to the auxiliary heat exchanger 150, and a second discharge pipe 364b that extends from the auxiliary heat exchanger 150 to the first pipe 361, and guides the flow of the refrigerant passed through the auxiliary heat exchanger 150.

The GHP system 10 may include the fifth pipe 365 that guides the flow of the refrigerant passing through the radiator 330. The fifth pipe 365 may include a third introduction pipe 365a that guides the flow of the refrigerant from the third port 323 of the second flow switch 320 to the radiator 330, and a third discharge pipe 365b that extends from the radiator 330 to the first pipe 361, and guides the flow of the refrigerant having passed through the radiator 330.

FIG. 4 illustrates a flow state of the cooling water in the first mode of the GHP system 10. The "first mode" may be a general operation mode of the GHP system 10, for example, may be a cooling operation mode or a warming operation mode. The first mode may be performed when a temperature of the refrigerant having passed through the engine 200 is a set or predetermined temperature or more.

When the cooling water pump 300 is driven, the cooling water may pass through the engine 200, be introduced into the hot water heat exchanger 450 through the first introduction pipe 362a, exchange heat with the fluid supplied from the hot water supply tank 400, and then be discharged to the first discharge pipe 362b. The cooling water may be introduced into the first port 311 of the first flow switch 310, and be discharged to the second port 312. At this point, the third port 313 may be closed, and thus, the flow of the cooling water to the sixth pipe 366 may be limited.

The cooling water discharged from the first flow switch 310 may be introduced into the first port 321 of the second flow switch 320, and may flow to the auxiliary heat exchanger 150 through the second port 322, or may flow to the radiator 330 through the third port 323. The cooling water flowing to the second port 322 may be introduced into the auxiliary heat exchanger 150 through the second introduction pipe 364a, exchange heat in the auxiliary heat exchanger 150, and then, may flow to the first pipe 361 through the second discharge pipe 364b. The cooling water flowing to the third port 323 may be introduced into the radiator 330 through the third introduction pipe 365a, exchange heat in the radiator 330, and then, may flow to the first pipe 361 through the third discharge pipe 365b. The cooling water having flowed to the first pipe 361 may pass through the cooling water pump 300, and may be introduced again into the engine 200.

FIG. 5 illustrates the flow state of the cooling water in the second mode of the GHP system 10. The "second mode" may be a bypass mode of the cooling water. The second mode may be performed when the temperature of the cooling water passed through the engine 200 is the set or predetermined temperature or less.

When the cooling water pump 300 is driven, the cooling water may pass through the engine 200, be introduced into the hot water heat exchanger 450 through the first introduction pipe 362a, exchange heat with the fluid supplied from the hot water supply tank 400, and then be discharged to the first discharge pipe 362b. The cooling water may be introduced into the first port 311 of the first flow switch 310, and be discharged to the third port 313. At this point, the second port 312 may be closed, and thus, the flow of the cooling water to the third pipe 363 may be limited.

As the cooling water does not have a sufficiently high temperature which is the set or predetermined temperature or more, an effect that the cooling water flows to the auxiliary heat exchanger 150 and heats the refrigerant through the heat exchange with the refrigerant is not good, and a necessity that the cooling water flows to the radiator 330 and is cooled by the outdoor fan 122 is low.

The refrigerant discharged through the third port 313 may be introduced into the first pipe 361 via the sixth pipe 366, and pass through the cooling water pump 300. The cooling water may pass through the engine 200.

Hereinafter, additional embodiments will be described. As these embodiments may be the same as the previous embodiment, except for some configurations, differences therebetween will be mainly described, and reference numerals are the same or similar and repetitive descriptions of the same components as those in the previous embodiment have been omitted.

Figure 6:
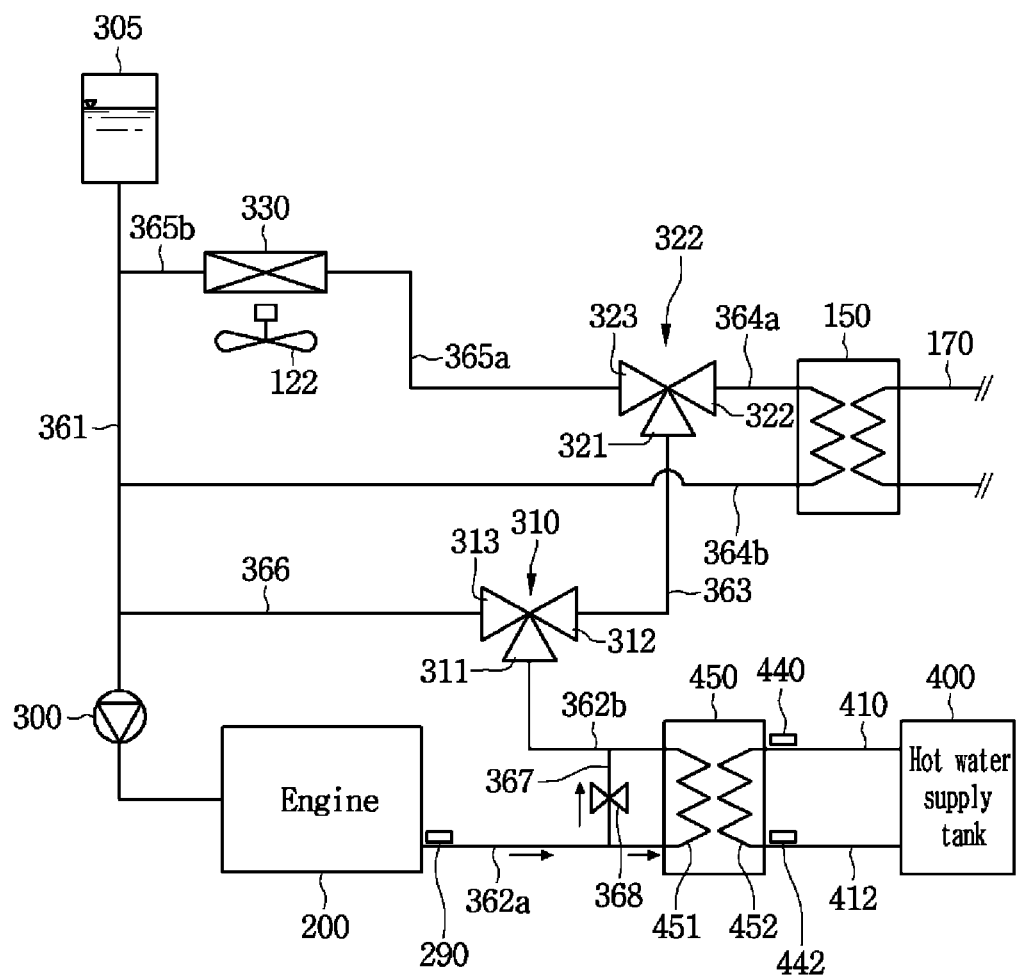
FIG. 6 is a schematic diagram of a main portion of a GHP system according to another embodiment.

FIG. 6 is a schematic diagram of a main component of a GHP system according to another embodiment. Referring to FIG. 6, GHP system 10 according to this embodiment may include a connection pipe 367, which may be provided such that at least some of the cooling water having passed through the engine 200 may bypass the hot water heat exchanger 450.

The connection pipe 367 may extend from the first introduction pipe 362a extending from the engine 200 to the hot water heat exchanger 450 toward the first discharge pipe 362b extending from the hot water heat exchanger 450 to the first flow switch 310. In other words, a first end of the connection pipe 367 may be connected to one point of or on the first introduction pipe 362a, and a second end thereof may be connected to one point of or on the first discharge pipe 362b.

A bypass valve 368 may be provided at or on the connection pipe 367. For example, the bypass valve 368 may include a solenoid valve, which may be controllable to be opened and closed, or an electronic expansion valve, an opening degree of which may be controllable. When the bypass valve 368 is closed, or an opening degree thereof is reduced, an amount of cooling water introduced into the hot water heat exchanger 450 may be reduced. However, when the bypass valve 368 is opened, or the opening degree thereof is increased, the amount of cooling water introduced into the hot water heat exchanger 450 may be increased.

In an entire path of the cooling water, the hot water heat exchanger 450 may be understood as a resistor that obstructs the flow of the cooling water. Therefore, when a demand for the hot water is not high, or it is necessary to increase a flow rate of the cooling water to the auxiliary heat exchanger 150 or the radiator 330, the bypass valve 368 may be opened, or the opening degree thereof may be controlled to be increased. When the bypass valve 368 is opened, or the opening degree thereof is increased, at least some of the cooling water having passed through the engine 200 may bypass the hot water heat exchanger 450, and may be introduced into the first flow switch 310, and thus, there is an effect that the flow rate of the cooling water circulated in the system is increased.

Figure 7:
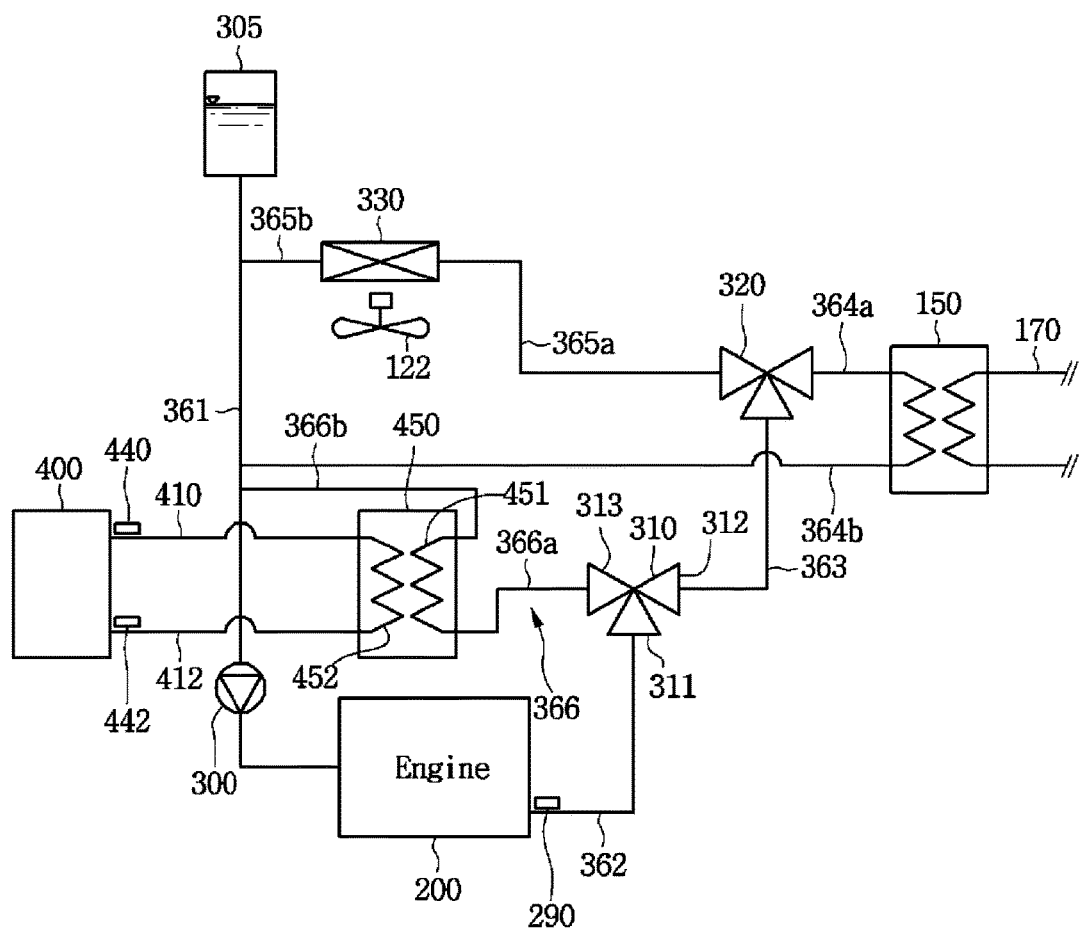
FIG. 7 is a schematic diagram of a main portion of a GHP system according to still another embodiment.

FIG. 7 is a schematic diagram of a main portion of a GHP system according to still another embodiment. Referring to FIG. 7, GHP system 10 according to this embodiment may include the hot water heat exchanger 450, which may be installed at the sixth pipe 366.

The sixth pipe 366 may include a fourth introduction pipe 366a that guides the cooling water discharged from the third port 313 of the first flow switch 310 to the hot water heat exchanger 450, and a fourth discharge pipe 366b that guides the cooling water having passed through the hot water heat exchanger 450 to the first pipe 461. In the hot water heat exchanger 450, heat exchange between cooling water pipe 451, through which the cooling water flows, and cooling water pipe 452, through which the fluid flows, may be performed.

The cooling water having passed through the hot water heat exchanger 450 may flow to the first pipe 361 via the fourth discharge pipe 366b. The cooling water may pass through the cooling water pump 300, and may be introduced into the engine 200.

When there is a demand for hot water supply, the first flow switch 310 may be controlled to open the third port 313. At this point, the second port 312 may be opened or closed. By opening of the third port 318, the cooling water introduced into the first flow switch 310 may be discharged to the sixth pipe 366 through the third port 313, and pass through the hot water heat exchanger 450. However, when there is not the demand for hot water supply, the first flow switch 310 may be controlled to close the third port 313, and thus, the cooling water may be prevented from being introduced into the hot water heat exchanger 450.

That is, a cooling water path through which the cooling water may flow to the hot water heat exchanger 450, and a cooling water path through which the cooling water may flow to the auxiliary heat exchanger 150 or the radiator 330 may be formed in parallel. According to such a configuration, as the cooling water, which should flow to the auxiliary heat exchanger 150 or the radiator 330, does not pass through the hot water heat exchanger 450, resistance against the flow of the cooling water becomes smaller or decreases, and thus, the flow rate of the cooling water, which is circulated in the system, may be prevented from being reduced.

According to a GHP system according to embodiments disclosed herein, as the heat exchanger which can supply the hot water is provided, and waste heat of the engine may be supplied to the heat exchanger, performance of the GHP system may be improved. Also, as two flow switches may be provided, and thus, circulation of the cooling water to the auxiliary heat exchanger, the hot water heat exchanger, and the radiator may be controlled, a simple structure of the heat-pump system may be realized, and a control method thereof may also be simplified. Further, operation reliability of the heat-pump system may be enhanced.

Also, as the path through which the cooling water may be bypassed to the engine when the temperature of the circulating cooling water is not increased to the set or predetermined temperature is provided, the circulating water having passed through the engine may be prevented from being supplied to the auxiliary heat exchanger or the radiator, and thus, the circulating water may be prevented from being unnecessarily supplied. As the connection pipe the connects the inlet path and the outlet path of the hot water heat exchanger and the bypass valve, which may be provided at the connection pipe, are provided, resistance applied to the circulating cooling water may be reduced, and thus, a flow rate of the cooling water may be prevented from being reduced. As the hot water heat exchanger may be provided at the bypass pipe, the resistance applied to the circulating cooling water may be reduced, and thus, the flow rate of the cooling water may be prevented from being reduced.

Embodiments disclosed herein are directed to providing a gas heat-pump (GHP) system which is able to use waste heat of an engine. Also, embodiments disclosed herein are directed to providing a GHP system which is able to reduce a number of additional components and to increase productivity thereof.

Further, embodiments disclosed herein are directed to providing a GHP system which is able to simply realize circulation control of cooling water. Furthermore, embodiments disclosed herein are directed to providing a GHP system having a structure in which circulating water is bypassed to an engine when a temperature of the circulating water or the cooling water is not increased by a set or predetermined temperature. Also, embodiments disclosed herein are directed to providing a GHP system having a structure which is able to reduce resistance against cooling water which is being circulated.

Even though all elements of embodiments may be coupled into one or operated in a combined state, embodiments are not limited thereto. That is, all the elements may be selectively combined with each other without departing from the scope. Further, when it is described that one comprises (or includes or has) some elements, it should be understood that it may comprise (or include or have) only those elements, or it may comprise (or include or have) other elements as well as those elements if there is no specific limitation. Unless otherwise specifically defined herein, all terms comprising technical or scientific terms are to be given meanings understood by those skilled in the art. Like terms defined in dictionaries, generally used terms need to be construed as meaning used in technical contexts and are not construed as ideal or excessively formal meanings unless otherwise clearly defined herein.

Although embodiments have been described with reference to a number of illustrative embodiments thereof, it will be understood by those skilled in the art that various changes in form and details may be made therein without departing from the spirit and scope as defined by the appended claims. Therefore, embodiments should be considered in a descriptive sense only and not for purposes of limitation, and also the technical scope is not limited to the embodiments. Further, embodiments defined not by the detailed description but by the appended claims, and all differences within the scope will be construed as being comprised in the present disclosure.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A gas heat-pump system, comprising:
   an air-conditioning system including at least one compressor, an outdoor heat exchanger, an expander, an indoor heat exchanger, a four-way valve, a gas-liquid separator, an oil separator connected to a suction side of the at least one compressor, and a plurality of refrigerant pipes;
   an engine configured to provide power for an operation of the at least one compressor, and in which a mixed fuel in which a fuel and air are mixed is burned;
   a cooling water pump that pumps a flow of cooling water that cools the engine;
   a cooling water pipe connected to the cooling water pump, and configured to guide the flow of the cooling water;
   an auxiliary heat exchanger, in which heat exchange between the cooling water flowing through the cooling water pipe and a refrigerant flowing through the plurality of refrigerant pipes is performed;
   a hot water heat exchanger, in which heat exchange between the cooling water flowing through the cooling water pipe and a fluid supplied from a hot water supply tank is performed; and
   a plurality of flow switches installed at the cooling water pipe, the plurality of flow switches being configured to be controlled so that the cooling water discharged from the engine is guided to the auxiliary heat exchanger or the hot water heat exchanger, wherein the plurality of refrigerant pipes includes:
   a first refrigerant pipe that extends from the four-way valve to the outdoor heat exchanger;
   a second refrigerant pipe that extends from the four-way valve to the indoor heat exchanger;
   a branch refrigerant pipe branched from the second refrigerant pipe, and that extends to the gas-liquid separator; and
   a third refrigerant pipe that extends from the four-way valve to the branch refrigerant pipe, and wherein the auxiliary heat exchanger is installed on the third refrigerant pipe.

2. The gas heat-pump system according to claim 1, further including a cooling water tank in which the cooling water is stored, wherein the cooling water pipe includes a first pipe that extends from the cooling water tank to the engine so that the cooling water is introduced into the engine.

3. The gas heat-pump system according to claim 2, wherein the plurality of flow switches includes a first flow switch, wherein the cooling water pipe further includes a second pipe that extends from an outlet side of the engine to the first flow switch, and wherein the hot water heat exchanger is installed at the second pipe.

4. The gas heat-pump system according to claim 3, wherein the plurality of flow switches includes a second flow switch, and the cooling water pipe further includes a third pipe, that extends from the first flow switch to the second flow switch.

5. The gas heat-pump system according to claim 4, wherein the cooling water pipe further includes a fourth pipe, that extends from a first port of the second flow switch to the auxiliary heat exchanger.

6. The gas heat-pump system according to claim 5, further including a radiator installed at one side of an outdoor fan provided at the air-conditioning system, wherein the cooling water pipe further includes a fifth pipe, that extends from a second port of the second flow switch to the radiator.

7. The gas heat-pump system according to claim 6, further including a sixth pipe, that extends from the first flow switch to the first pipe and bypasses the cooling water heat-exchanged in the hot water heat exchanger to the engine.

8. The gas heat-pump system according to claim 7, further including a cooling water temperature sensor that senses a temperature of the cooling water discharged from the engine, wherein, when a temperature value sensed by the cooling water temperature sensor is a predetermined temperature or less, the first flow switch is controlled so that the cooling water flows through the sixth pipe.

9. The gas heat-pump system according to claim 3, wherein the second pipe further includes:
a first introduction pipe that guides the cooling water discharged from the engine to the hot water heat exchanger; and
a first discharge pipe that guides the cooling water heat-exchanged in the hot water heat exchanger to the first flow switch.

10. The gas heat-pump system according to claim 9, further including a connection pipe that extends from one point of the first introduction pipe to one point of the first discharge pipe so that at least some of the cooling water discharged from the engine bypasses the hot water heat exchanger.

11. The gas heat-pump system according to claim 10, further including a bypass valve installed at the connection pipe.

12. The gas heat-pump system according to claim 3, further including a sixth pipe that extends from the first flow switch to the first pipe.

13. The gas heat-pump system according to claim 1, further including:
an inlet path, that extends from the hot water supply tank to the hot water heat exchanger and guides the fluid to the hot water heat exchanger, and
an outlet path, that extends from the hot water heat exchanger to the hot water supply tank and guides the fluid heat-exchanged in the hot water heat exchanger to the hot water supply tank.

14. The gas heat-pump system according to claim 1, wherein the hot water heat exchanger includes:
a cooling water pipe that guides the flow of the cooling water; and
a hot water pipe that guides a flow of the fluid supplied from the hot water supply tank.

15. The gas heat-pump system according to claim 1, wherein at least one of the plurality of flow switches includes a 3-way valve.

16. The gas heat-pump system according to claim 1, wherein the plurality of refrigerant pipes further includes:
a fourth refrigerant pipe that extends from the four-way valve to the oil separator; and
an injection pipe branched from the fourth refrigerant pipe, and that extends to the branch refrigerant pipe.

17. The gas heat-pump system according to claim 1, wherein the air-conditioning system further includes:
a subcooling heat exchanger provided at an outlet side of the expander; and
a subcooling path connected to the subcooling heat exchanger, and wherein the subcooling path extends to the branch refrigerant pipe.

18. The gas heat-pump system according to claim 2, further including an exhaust gas heat exchanger installed at the first pipe, in which the cooling water in the first pipe heat exchanges with an exhaust gas of the engine generated after burning the mixed fuel in the engine.

19. The gas heat-pump system according to claim 13, further including a first temperature sensor provided at the inlet path that senses a temperature of the fluid introduced into the hot water heat exchanger, and a second temperature sensor provided at the outlet path that senses a temperature of the fluid discharged from the hot water heat exchanger.

* * * * *